(12) United States Patent
Albright et al.

(10) Patent No.: US 12,414,847 B2
(45) Date of Patent: Sep. 16, 2025

(54) SYSTEMS AND METHODS FOR CONTROLLING AN ORAL IRRIGATOR

(71) Applicant: KONINKLIJKE PHILIPS N.V., Eindhoven (NL)

(72) Inventors: Ethan Albright, Mill Creek, WA (US); Jeffrey Groves, Seattle, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 904 days.

(21) Appl. No.: 17/437,098

(22) PCT Filed: Feb. 28, 2020

(86) PCT No.: PCT/EP2020/055349
§ 371 (c)(1),
(2) Date: Sep. 8, 2021

(87) PCT Pub. No.: WO2020/182502
PCT Pub. Date: Sep. 17, 2020

(65) Prior Publication Data
US 2022/0175502 A1    Jun. 9, 2022

Related U.S. Application Data

(60) Provisional application No. 62/815,578, filed on Mar. 8, 2019.

(51) Int. Cl.
*A61C 17/02*    (2006.01)
*A61C 17/024*    (2006.01)
*A61H 13/00*    (2006.01)

(52) U.S. Cl.
CPC ........ *A61C 17/024* (2019.05); *A61C 17/0202* (2013.01); *A61C 17/0205* (2013.01)

(58) Field of Classification Search
CPC . A61C 17/00; A61C 17/02–028; A61C 17/12; A61C 1/0007; A61H 9/0007; A61H 9/0021; A61H 13/005
See application file for complete search history.

(56) References Cited

U.S. PATENT DOCUMENTS 4,669,453 A    6/1987  Atkinson
2005/0109212 A1*  5/2005  Cattani ................. A61C 17/12
                                                    96/397

(Continued)

FOREIGN PATENT DOCUMENTS

CN    203634323 U  *  6/2014
EP        2541214 A1    1/2013

(Continued)

OTHER PUBLICATIONS

CN 203634323 U description (Year: 2014).*

(Continued)

*Primary Examiner* — Timothy A Stanis
*Assistant Examiner* — Kira B Daher

(57) ABSTRACT

The present disclosure is directed to systems and methods for electronic control of an operating level of an oral irrigator, particularly when flow from the oral irrigator is paused. Methods for controlling an operational level include: determining an operational level of the oral irrigator, including whether the operational level is a standby mode; receiving sensor data from one or more sensors; determining whether a key sensor indicator is above, below, or at a threshold. If the key sensor indicator is above a threshold, the operational level is changed to standby mode. If the key sensor indicator is at or below the threshold, the operational level remains at the current level. If the key sensor indicator is below the threshold, and the current operational level is the standby mode, the operational level (Continued)

is changed to the operational level set before entering standby mode.

20 Claims, 2 Drawing Sheets

(56) References Cited

U.S. PATENT DOCUMENTS

| | | | | |
|---|---|---|---|---|
| 2006/0097084 A1* | 5/2006 | Gromer | ................ | F04B 49/126 |
| | | | | 239/525 |
| 2008/0255498 A1* | 10/2008 | Houle | ................ | A61C 17/0208 |
| | | | | 604/20 |
| 2014/0272769 A1* | 9/2014 | Luettgen | ............ | A61C 17/0202 |
| | | | | 433/215 |
| 2016/0022392 A1 | 1/2016 | Chang | | |
| 2017/0281312 A1 | 10/2017 | Khakpour | | |
| 2018/0125221 A1* | 5/2018 | Wronski | ................ | A61C 17/36 |

FOREIGN PATENT DOCUMENTS

| | | | |
|---|---|---|---|
| KR | 101289954 B1 * | 7/2013 | |
| WO | WO-2016097907 A1 * | 6/2016 | ........... A61B 5/4547 |

OTHER PUBLICATIONS

KR 101289954 B1 description (Year: 2013).*
International Search Report and Written Opinion of PCT/EP2020/055349, dated May 28, 2020.

* cited by examiner

SYSTEMS AND METHODS FOR CONTROLLING AN ORAL IRRIGATOR

FIELD OF THE INVENTION

The present disclosure is directed to systems and methods for electronic control of an operational level of an oral irrigator, particularly when flow from the oral irrigator is paused.

BACKGROUND

Oral irrigators are sometimes designed with the ability to adjust the intensity of the water pressure to suit the needs of individual users. These irrigators use a mechanical intensity control system which works by diverting a portion of the outlet flow from the pump back to the inlet. The amount of return flow is controlled by the user, which in turn varies intensity at the nozzle. With this architecture the pump operates at a fixed voltage and only varies in speed in response to varying load conditions.

Another feature present in oral irrigators is pause control. This control provides the user with the ability to stop and start flow while holding the handle portion of the nozzle. Typically this control works by operating a valve that simply blocks the flow of water from the pump to the nozzle. Without a secondary flow path, the pressure will rise in the pump potentially resulting in damage, thus a means of limiting pressure is required. To this ends, a pressure relief valve is commonly implemented.

SUMMARY OF THE INVENTION

The present disclosure is directed to systems and methods for electronic control of an operational level of an oral irrigator. The systems and methods of electronic control discussed herein pair methods of detecting pump load with an electronic pump control system. The electronic pump control system places the pump in a standby state when the load has exceeded a defined threshold and then returns the pump to its pre-load state when the load condition is within normal range.

Generally, in one aspect, an oral irrigator system is provided. The system comprises: an irrigator tip; a reservoir containing the fluid, the reservoir in fluid communication with a pump sub-assembly; one or more sensors arranged to detect a change in the flow; and a controller. The irrigator tip comprises: a handle portion; a nozzle; a channel in fluid communication with the handle portion and the nozzle; and an actuator, the actuator arranged to at least partially alter a flow of a fluid through the channel. The controller is configured to: determine whether a key sensor indicator is above, below, or at a threshold; and if the key sensor indicator is above a threshold, change an operational level of the oral irrigator to a standby mode; or if the key sensor indicator is at or below the threshold, remain at a current operational level; or if the key sensor indicator is below the threshold, and the current operational level of the oral irrigator is standby mode, change the operational level of the oral irrigator to a preset intensity operational level previously set before entering standby mode.

In an aspect, the system is further configured such that the change in flow results in a change in pressure, a change in electrical load on a motor of the pump, or a change in speed of the motor of the pump.

In an aspect, the system is further configured such that the standby mode is an operational level where a motor of the pump does not exceed a tolerance temperature.

In an aspect, the system is further configured such that the standby mode is an operational level where a motor of a pump is operating at low power.

In an aspect, the system is further configured such that the threshold to enter the standby mode of the pump differs based on the current operational level of the oral irrigator.

In an aspect, the system is further configured such that the key sensor indicator is flow, pressure, electrical load on a motor of the pump, or speed of the motor of the pump depending on an intensity of operational level of the oral irrigator.

In an aspect, the system is further configured such that the key sensor indicator measures a load of a motor of the pump, and the load is calculated using current flowing through the motor of the pump or a power supply of the motor.

In an aspect, the system is further configured such that the oral irrigator comprises: a housing having a reservoir containing fluid, the reservoir in fluid communication with a pump; and a tether having a first end and a second end, the first end of the tether in fluid communication with the irrigator tip and the second end of the tether in fluid communication with the pump.

Generally, in one aspect, a method for controlling an operational level of an oral irrigator is provided. The method comprises: determining, using a controller of the oral irrigator, an operational level of the oral irrigator, including whether the operational level is a standby mode; receiving, using the controller of the oral irrigator, sensor data from one or more sensors; determining, using the controller of the oral irrigator, whether a key sensor indicator is above, below, or at a threshold; and if the key sensor indicator is above a threshold, changing the operational level of the oral irrigator to the standby mode; or if the key sensor indicator is at or below the threshold, remaining at a current operational level; or if the key sensor indicator is below the threshold, and the current operational level of the oral irrigator is the standby mode, changing the operational level of the oral irrigator to a preset intensity operational level previously set before entering standby mode.

In an aspect, the method allows for the standby mode to be an operational level where a motor of a pump does not exceed a tolerance temperature.

In an aspect, the method allows for the standby mode to be an operational level where a motor of a pump is operating at low power.

In an aspect, the method allows for the threshold to enter the standby mode to differ based on the current operational level of a pump of the oral irrigator.

In an aspect, the method allows for the key sensor indicator to be flow, pressure, electrical load on a motor of a pump, or speed of the motor of the pump depending on an intensity of the operational level of the oral irrigator.

In an aspect, the method allows for the key sensor indicator to measure a change in load of a motor of a pump, and the load is calculated using current flowing through the motor of the pump or a power supply of the motor.

In an aspect, the method allows for the key sensor indicator to measure a change in flow, a change in pressure, a change in electrical load on a motor of a pump, or a change in speed of the motor of the pump.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure is directed to systems and methods for electronic control of an operational level of an oral irrigator, particularly when flow from the oral irrigator is paused. The systems and methods of electronic control disclosed herein pair methods of detecting pump load with an electronic pump control system. The electronic pump control system places the pump in a standby state when the load has exceeded a defined threshold and can then return the pump to its pre-load state when the load condition is again within normal range. Methods of detection may include motor current, water pressure, pump speed, etc. Methods of electronic pump control involve placing the oral irrigator in standby mode when the pause control feature is utilized. The electronic pump control system receives sensor data from one or more sensors; determines the operational level of the oral irrigator; and determines whether a key sensor indicator is above, below, or at a threshold. If the key sensor indicator is above a threshold, a controller changes the operational level to the standby mode. If the key sensor indicator is at or below the threshold, a controller maintains the current operational level. If the key sensor indicator is below the threshold, and the current operational level is the standby mode, a controller changes the operational level to a preset intensity operational level previously set before entering standby mode. Applicant has recognized and appreciated that it would be beneficial to provide an electronic method to control operational level where a mechanical relief valve is not required for the operation of pause control.

Figure 1:
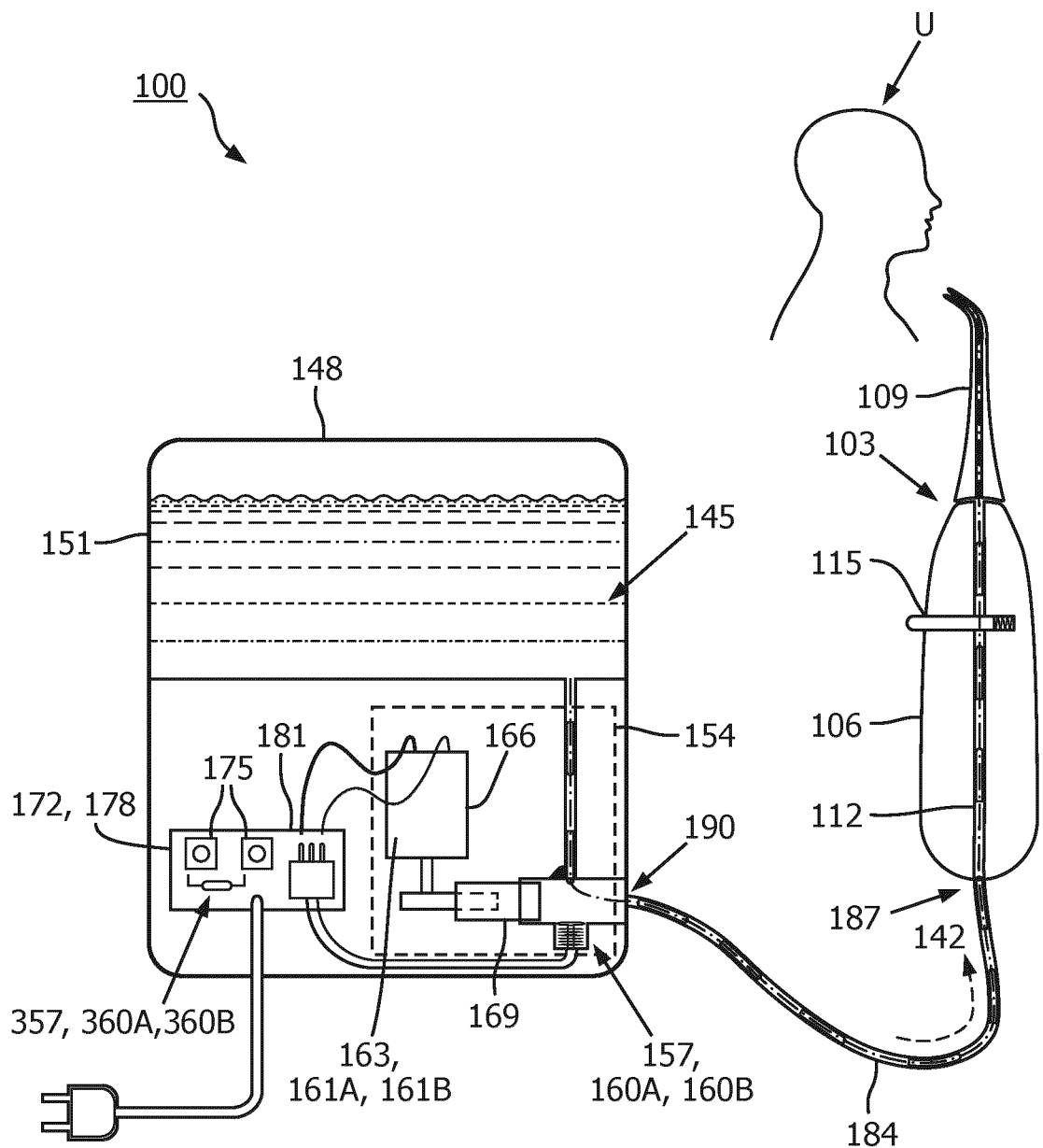
FIG. 1 is a schematic representation of an oral irrigator in accordance with an exemplary embodiment.

Referring to the figures, FIG. 1 illustrates oral irrigator 100. Oral irrigator 100 includes irrigator tip 103 having handle portion 106 and nozzle 109. Irrigator tip 103 further includes channel 112 which extends within and through both tip 103 and handle portion 106. Channel 112 provides flow 142 of fluid 145 to user U. Oral irrigator 100 further includes housing 148 which contains reservoir 151, pump 154, controller 172, and power supply 178. Reservoir 151 contains a volume of fluid 145 which during operation of oral irrigator 100 is directed through irrigator tip 103 into the mouth of user U. Fluid 145 can be selected from, for example, water, a water-gas mixture, oral cleansing concentrate, standard or antiseptic (alcohol based) mouthwash, or any fluid with a viscosity low enough to proceed through channel 112.

Pump 154 comprises pressure sensor 157, for example, a pressure transducer. Pressure sensor 157 is arranged to detect a first pressure 160A and a second pressure 160B. First pressure 160A is associated with a first state when first flow path is substantially aligned with channel 112. Second pressure 160B is associated with a closed state, when the first flow path is not substantially aligned with channel 112 and where flow 142 of fluid 145 through channel 112 is partially or completely restricted. The first pressure 160A and second pressure 160B are measured within the pump 154; however, it should be appreciated that first pressure 160A and second pressure 160B could be measured at any point along flow 142 spanning from the reservoir 151 to actuator 115. Accordingly, although pressure sensor 157 is illustrated within pump 154, it should be appreciated that pressure sensor 157 could be placed at any point along flow 142 spanning from the reservoir 151 to actuator 115.

Pump 154 further includes motor 163, crank 166, and piston 169. Motor 163, crank 166, and piston 169 work in concert to create a pressurized environment that facilitates flow 142 from reservoir 151, through tether 184, into irrigator tip 103 and into user U's mouth. Tether 184 is a substantially hollow, flexible tube, having a first end 187 and a second end 190. First end 187 of tether 184 is fixedly secured to handle portion 106 of irrigator tip 103 and second end 190 of tether 184 is fixedly secured to pump 154. Tether 184 functions as a conduit through which flow 142 of fluid 145 precedes from reservoir 151 to irrigator tip 103 and into user U's mouth for cleaning.

Actuator 115 can obstruct flow 142 and generate a back pressure, or build-up of pressure within the system which propagates along flow 142 back to pump 154. The actuator controls a pause control mechanism, where the flow 142 of fluid 145 through channel 112 is reduced or stopped when pause control is on and the system is paused, and the flow 142 of fluid 145 through channel 112 is resumed when pause control is off and the system is no longer paused. The actuator 115 can be any actuator or valve known in the art capable of at least partially altering flow 142, i.e., increasing or decreasing flow 142, e.g., a ball valve, a butterfly valve, a choke valve, a diaphragm or membrane valve, a gate valve, a globe valve, a knife valve, a needle valve, a pinch valve, a plug valve, a solenoid valve, a spool valve, a check valve, etc.

Controller 172 further comprises a processor and memory arranged to execute a series of non-transitory computer readable instructions to control the operation of motor 163. Controller 172 receives electrical power from power supply 178 and is arranged to control the speed and/or power of motor 163 by adjusting an operational current 181 of motor 163. Controller 172 includes controls 175. Controls 175 are utilized to turn oral irrigator 100 into an on or off state and/or alter the settings or modes of motor 163 thus changing the flow 142 of liquid 145 provided to user U.

Controller 172 comprises load sensor 357. Load sensor 357 is arranged to detect a first load 360A, a second load 360B, and/or a first motor speed 161A and a second motor speed 161B, on motor 163. To this end, load sensor 357 may be a current sensor or a sensor arranged to measure motor speed or rotations, e.g., a tachometer. First load 360A is associated with a first state when the first flow path is substantially aligned with channel 112. Second load is associated with closed state, when the first flow path is not substantially aligned with channel 112 and where flow 142 of fluid 145 through channel 112 is partially or completely restricted creating a back pressure within the system sufficient to change the load on motor 163. Preferably, first load 360A, second load 360B, first motor speed 161A, and second motor speed 161B are measured by load sensor 357 engaged to communicate with controller 172 and motor 163. Controller 172, e.g., receives first load 360A and second load 360B from load sensor 357 and adjusts the speed and/or power of motor 163, accordingly. As another example, first pressure 160A and second pressure 160B are measured by pressure sensor 157 engaged to communicate with controller 172 and motor 163. Controller 172, e.g., receives first pressure 160A and second pressure 160B from pressure sensor 157 and adjusts the speed and/or power of motor 163, accordingly.

Figure 2:
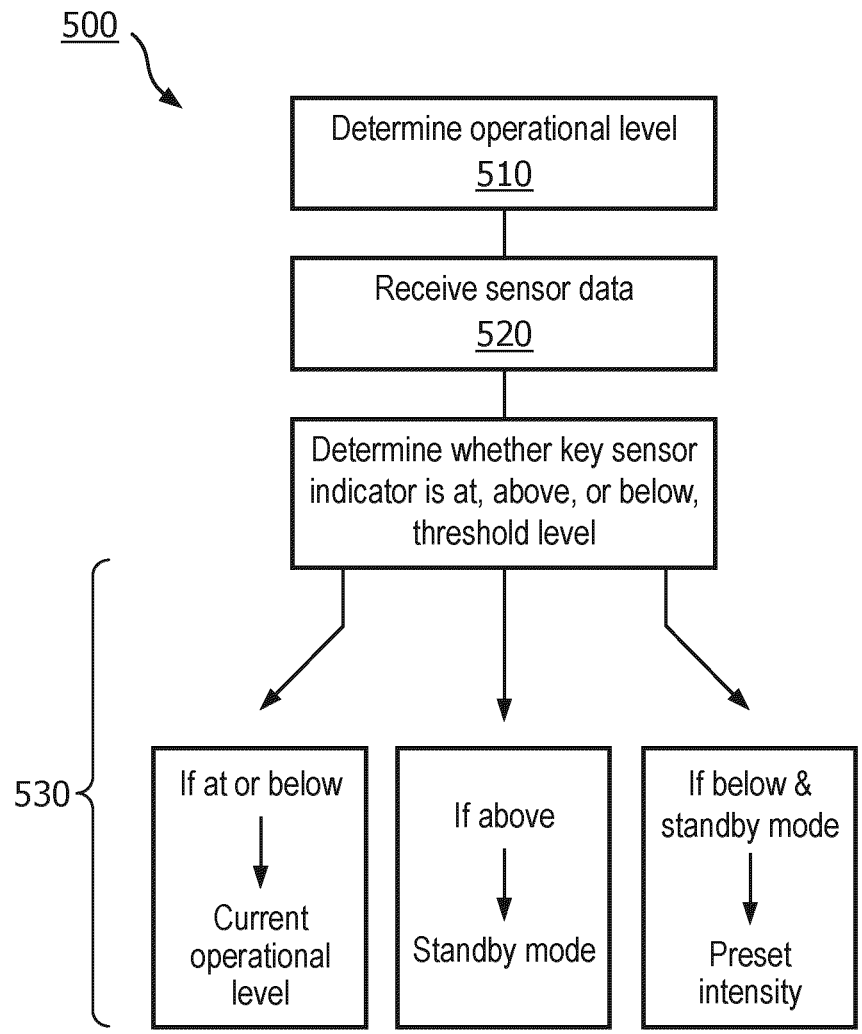
FIG. 2. is a flowchart of a method for controlling an operational level of an oral irrigator in accordance with an exemplary embodiment.

FIG. 2 is a flowchart which illustrates a method 500 for controlling an operational level of an oral irrigator 100. At step 510, an operational level of the oral irrigator 100 is determined using the controller 172 of the oral irrigator 100. The operational level indicates the power level of the oral irrigator 172, including whether the oral irrigator 172 is powered on or off, whether it is in a low power standby mode, and the power or intensity level at which the oral irrigator 100 is operating. The power or intensity level of the oral irrigator 100 can be varied to increase the operational current 181, motor 163 speed, pressure 160A, 160B along the fluid channel 112, and the flow 142 of fluid 145 through the fluid channel 112. The controller 172 detects the power state and operational level of the oral irrigator 100. The controller 172 can be an electrical controller, and the controller 172 can include controls 175 which are analog or digital. The analog controls 175 and/or the digital controls 175 can determine when flow 142 is blocked and transition the oral irrigator 100 from its preset intensity operational level to standby mode, and back again when flow 142 is unblocked.

At step 520, the controller 172 receives sensor data from one or more of the sensors, including load sensor 357 and/or pressure sensor 157. For example, the controller 172 is in communication with the load sensor 357 and the pressure sensor 157 and can detect the load 360A, 360B on the motor 163, motor speed 161A, 161B, and the pressure 160A, 160B along the fluid channel 112. The method can use sensor data from any type of sensor which can directly or indirectly detect a change in flow 142 along channel 112, including flow sensors, pressure detectors, load detectors, motor current detectors, motor speed detectors, or any other known sensors, or combinations of sensors and detection means.

At step 530, the controller 172 determines whether a key sensor indicator is above, below, or at a threshold level. The key sensor indicator is a sensor reading from the load sensor 357 and/or the pressure sensor 157, or any other sensor utilized by the system which provides information about the state of fluid 145 flow 142 through channel 112. The key sensor indicator can be a measure of flow 142, pressure 160A, 160B, electrical load 360A, 360B on the motor 163 of the pump 154, or speed 161A, 161B of the motor 163 of the pump 154 depending on an intensity of operational level of the oral irrigator 100. As an example, the key sensor indicator can measure a change in current 181 when the oral irrigator 100 is preset to a high intensity operational level. As another example, the key sensor indicator can measure a change in speed of the motor 163 when the oral irrigator 100 is preset to a low intensity operational level. For example, at lower intensity settings, first motor speed 161A and second motor speed 161B are measured by load sensor 357 engaged to communicate with controller 172 and motor 163. As another example, the key sensor indicator can be a measurement of the load on the motor 163 of the pump 154. The load on a motor 163 can be calculated using measured current. A current through the power supply of a motor 163 can be measured across a resistor. From the power supply current, a current through the motor 163 can be calculated. The current through the motor 163 can be divided by voltage or the pulse width modulation to determine the load on a motor 163.

The threshold level can vary based on several factors. The threshold level can vary based on which sensor reading is used as the key sensor indicator. For example, if current is used as the key sensor indicator, then the threshold level will be a measure of current, for example in amperes. Similarly, if pressure is used as the key sensor indicator, then the threshold level will be a measure of pressure, for example an amount in pascals. The threshold also can vary based on the intensity level at which the oral irrigator 100 is operating or was previously set to before entering standby mode. For example, if the oral irrigator 100 has intensity levels 1-5, corresponding to increasing flow rates through channel 112, the threshold for each intensity level will be different. For example, a user selectable intensity level can correspond with a motor voltage that determines the amount of flow and pressure (intensity level), and for greater intensity levels, the value of the threshold is greater. As an example, the load that triggers the pump to go into standby mode is sized appropriately for each intensity so that the user experience when pausing flow will be consistent regardless of the intensity level setting.

At step 530, if the key sensor indicator is above a threshold, the controller 172 changes the operational level of the oral irrigator 100 to a standby mode. If the key sensor indicator is at or below the threshold, the controller 172 does not change the operational level and the oral irrigator 100 remains at the current operational level. If, on the other hand, the key sensor indicator is below the threshold, and the current operational level of the oral irrigator 100 is standby mode, at step 530, the controller 172 will change the operational level of the oral irrigator 100 to a preset intensity level. The preset intensity is the operational level, for example, intensity level 1, intensity level 2 or intensity level 3, at which the oral irrigator 100 was operating before it entered standby mode.

Standby mode is an operational level of the oral irrigator 100 where the oral irrigator 100 is operating at low power. When in standby mode, the motor 163 is not off. It is stalled in a low-power state within which the motor 163 can remain indefinitely without damage because the motor 163 does not exceed a tolerance temperature. The tolerance temperature is set so that the motor 163 does not overheat and to ensure reliable operation of the motor 163. The power must be sufficient to allow the pump to maintain a small amount of pressure in the system as long as a source of the blockage downstream (flow 142 through channel 112) is present, but not enough to overheat and damage the motor 163 or affect its reliability. This is key because it enables the system to detect when the blockage is removed and again resume normal operation of the pump thereafter. The oral irrigator systems utilizing method 500 will appear to turn off when the pause control mechanism is set to on (flow 142 through channel 112 is reduced or blocked) and eliminate the inherent noise and vibrations present in systems with pressure relief valves. Furthermore, as no pressure relief valve is required in the oral irrigator of method 500, pump efficiency may be optimized to deliver maximum output. As an example, under normal operation, current should be below the threshold level or value. However, when flow 142 is blocked when the pause control feature is utilized, the current will exceed this threshold triggering standby mode.

The pump will remain in this state as long as the current is above a threshold. Upon release of pause control, the pressure in the system will rapidly decrease resulting in less torque on the motor, and in turn cause the current to return normal range, signaling the controller 172 to deactivate standby mode. Once deactivated, the system will resume operation at the same intensity to which it was set prior to being paused.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. As used herein in the specification and in the claims, "or" should be understood to have the same meaning as "and/or" as defined above.

It should also be understood that, unless clearly indicated to the contrary, in any methods claimed herein that include more than one step or act, the order of the steps or acts of the method is not necessarily limited to the order in which the steps or acts of the method are recited.

The invention claimed is:

1. An oral irrigator operable at a plurality of selectable intensity levels, the oral irrigator comprising:
   an irrigator tip, the irrigator tip comprising:
      a handle portion;
      a nozzle;
      a channel in fluid communication with the handle portion and the nozzle; and
      an actuator, the actuator arranged to at least partially alter a flow of a fluid through the channel;
   a reservoir containing the fluid, the reservoir in fluid communication with a pump;
   one or more sensors arranged to detect a change in the flow of the fluid in the channel; and
   a controller configured to:
      determine whether a sensor indicator from the one or more sensors is below a threshold; and
      when the sensor indicator is below the threshold and a power level of the oral irrigator is currently a standby mode, change the power level of the oral irrigator to a preset power level corresponding to a previously selected non-zero intensity level set before entering the standby mode.

2. The oral irrigator of claim 1, wherein the change in the flow of the fluid results in a change in pressure, a change in electrical load on a motor of the pump, or a change in speed of the motor of the pump.

3. The oral irrigator of claim 1, wherein the standby mode is a power level where a motor of the pump does not exceed a tolerance temperature.

4. The oral irrigator of claim 1, wherein the standby mode is a power level where a motor of the pump is operating at low power.

5. The oral irrigator of claim 4, wherein in the standby mode, the motor of the pump is not shut off.

6. The oral irrigator of claim 1, wherein the sensor indicator is flow, pressure, electrical load on a motor of the pump, or speed of the motor of the pump depending on an intensity of the power level of the oral irrigator.

7. The oral irrigator of claim 1, wherein the sensor indicator measures a load of a motor of the pump, and wherein the load is calculated using current flowing through the motor of the pump or a power supply of the motor.

8. The oral irrigator of claim 1, further comprising:
   a housing having the reservoir containing the fluid, the reservoir in fluid communication with the pump; and
   a tether having a first end and a second end, the first end of the tether in fluid communication with the irrigator tip and the second end of the tether in fluid communication with the pump.

9. A method for controlling a power level of an oral irrigator operable at a plurality of selectable intensity levels, the method comprising:
   determining, using a controller of the oral irrigator, a power level of the oral irrigator, including whether the power level is a standby mode;
   receiving, using the controller of the oral irrigator, sensor data from one or more sensors;
   determining, using the controller of the oral irrigator, whether a sensor indicator from the one or more sensors is below a threshold; and
   when the sensor indicator is below the threshold, and the power level of the oral irrigator is the standby mode, changing the power level of the oral irrigator to a preset power level corresponding to a previously selected non-zero power level corresponding to the previously selected intensity level set before entering standby mode.

10. The method of claim 9, wherein the standby mode is a power level where a motor of a pump does not exceed a tolerance temperature.

11. The method of claim 9, wherein the standby mode is a power level where a motor of a pump is operating at low power.

12. The method of claim 11, wherein in the standby mode, the motor of the pump is not shut off.

13. The method of claim 9, wherein the threshold differs based on a current power level of a pump of the oral irrigator.

14. The method of claim 9, wherein the sensor indicator is flow, pressure, electrical load on a motor of a pump, or speed of the motor of the pump depending on an intensity of the power level of the oral irrigator.

15. The method of claim 9, wherein the sensor indicator measures a change in load of a motor of a pump, and wherein the load is calculated using current flowing through the motor of the pump or a power supply of the motor.

16. The method of claim 9, wherein the sensor indicator measures a change in flow, a change in pressure, a change in electrical load on a motor of a pump, or a change in speed of the motor of the pump.

17. An oral irrigator operable at a plurality of selectable intensity levels, the oral irrigator comprising:
   an irrigator tip, the irrigator tip comprising:
      a handle portion;
      a nozzle;
      a channel in fluid communication with the handle portion and the nozzle; and
      an actuator configured to at least partially alter a flow of a fluid through the channel;
   a reservoir containing the fluid, the reservoir in fluid communication with a pump;
   one or more sensors arranged to detect a change in the flow of the fluid in the channel; and
   a controller configured to:
      identify a selected intensity level of the plurality of selectable intensity levels, the intensity level having a corresponding preset non-zero power level;
      when a sensor indicator is above a threshold, change a power level of the oral irrigator to a standby mode; and
      when the sensor indicator is below the threshold and the power level of the oral irrigator currently is the standby mode, change the power level of the oral irrigator to the corresponding preset power level of the selected intensity level set.

18. The oral irrigator of claim 17, wherein the sensor indicator is flow, pressure, electrical load on a motor of the pump, or speed of the motor of the pump.

19. The oral irrigator of claim 18, wherein in the standby mode, the motor of the pump is not shut off.

20. The oral irrigator of claim 17, further comprising:
   a housing having the reservoir containing the fluid, wherein the reservoir is in fluid communication with the pump; and
   a tether in fluid communication with the irrigator tip and the pump.

* * * * *